Figure 1:
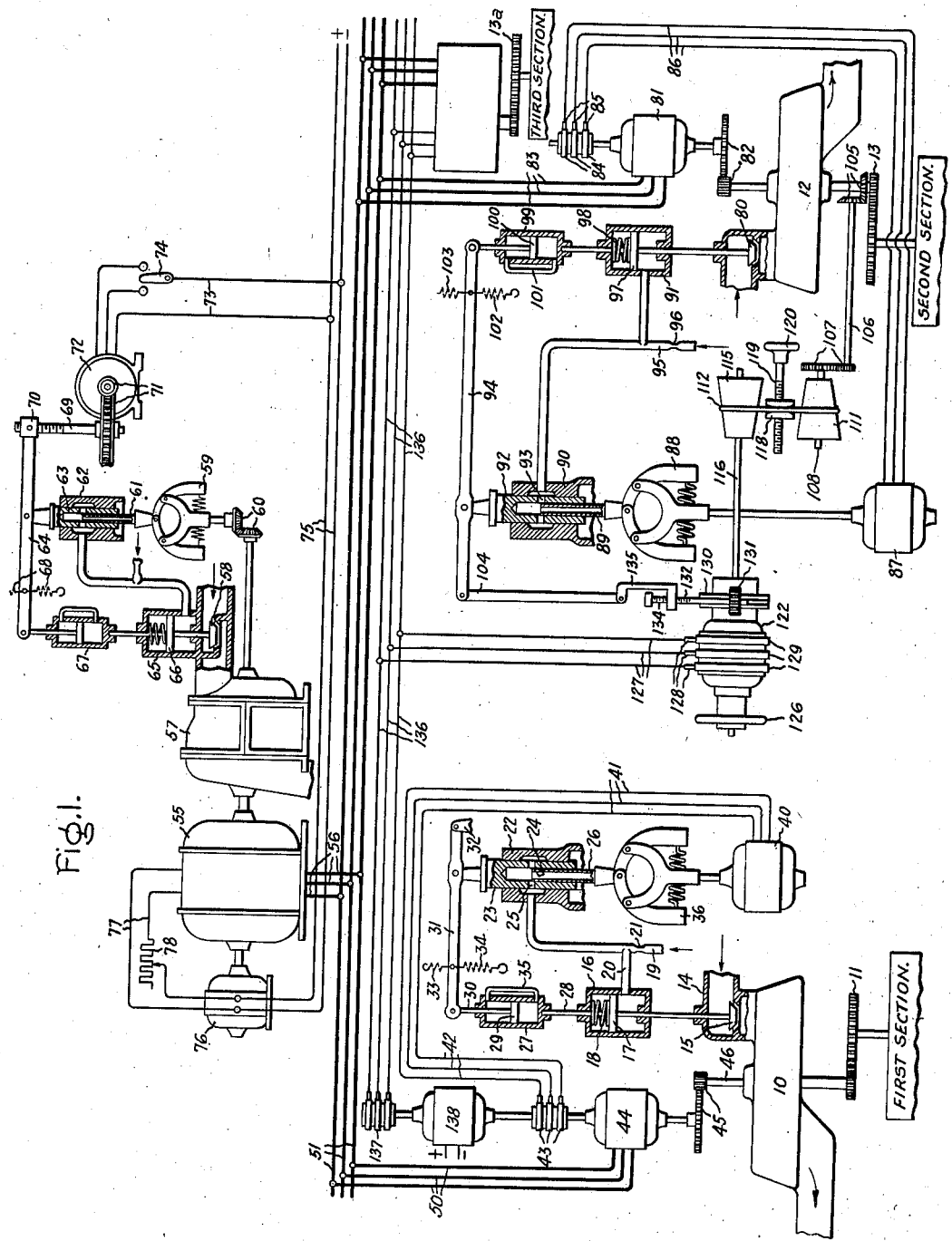

July 19, 1938.　　　R. G. STANDERWICK　　　2,124,435
ELASTIC FLUID ENGINE CONTROL
Filed Aug. 13, 1936　　　2 Sheets-Sheet 1

Inventor:
Reginald G. Standerwick,
by Harry E. Dunham
His Attorney.

July 19, 1938.  R. G. STANDERWICK  2,124,435
ELASTIC FLUID ENGINE CONTROL
Filed Aug. 13, 1936  2 Sheets-Sheet 2

Inventor:
Reginald G. Standerwick,
by Harry E. Dunham
His Attorney.

Patented July 19, 1938

2,124,435

UNITED STATES PATENT OFFICE 2,124,435

ELASTIC FLUID ENGINE CONTROL

Reginald G. Standerwick, Marblehead, Mass., assignor to General Electric Company, a corporation of New York Application August 13, 1936, Serial No. 95,836

17 Claims. (Cl. 60—97)

The present invention relates to elastic fluid engine control, more specifically to arrangements for accurately controlling the speed of individual and of a plurality of elastic fluid turbines and like prime movers. The control of such prime movers by means of flyball type speed governors permits accurate control within speed ranges of the order of 1 to 2½, for example, from 500 to 1250 R. P. M. Complicated arrangements have to be resorted to if accurate control is desired within a wider speed range, for example, where the turbine speed varies within limits of 180 and 1800 R. P. M. Another problem presents itself in the application of elastic fluid engines, particularly turbines for operating paper mills and like manufacturing plants in which a plurality of turbines or prime movers are required for driving different sections of such plant. These turbines often have to be controlled so that they run at the same or at different speeds and that their speed relation remains fixed or constant at varying speeds of a master turbine. For example, with respect to the first case, there may be an arrangement including 10 turbines driving separate elements at speeds varying from 180 to 1800 R. P. M. At any speed between these ranges all turbines must run at exactly the same speed which may be determined by a master turbine. In the second case, which applies especially to paper mill arrangements, it may be desired to run a master or first turbine at different speeds within a range of 180 to 1800 R. P. M. and a second turbine at a speed at all times a certain fixed percentage, for instance 5% higher than that of the master turbine, a third turbine at a speed which is at all times 3% lower than that of the master turbine, etc.

One object of my invention is to provide an improved construction and arrangement of speed control whereby an individual turbine or prime mover may be accurately controlled and its speed gradually varied within a wide range at constant speed of its speed governor.

Another object of my invention is to provide an improved construction and arrangement of speed control whereby a plurality of elastic fluid turbines, engines, or prime movers may be accurately controlled so as to maintain either equal speeds or fixed speed relations under different operating conditions. "Different operating conditions" in the last case may be in the form of variable speed operation of a master turbine or prime mover.

For a consideration of what I believe to be novel and my invention, attention is directed to the following description and the claims appended thereto in connection with the accompanying drawings.

Figure 2:
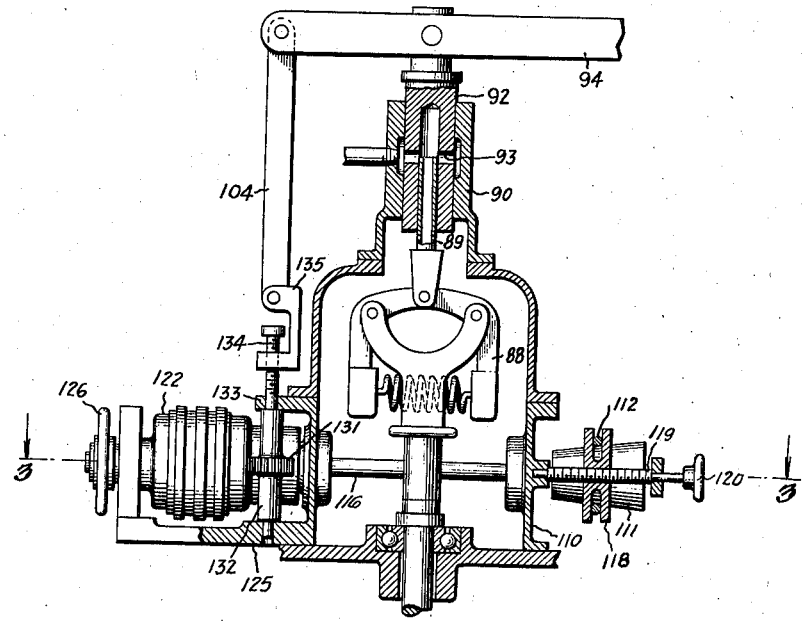
Figure 3:
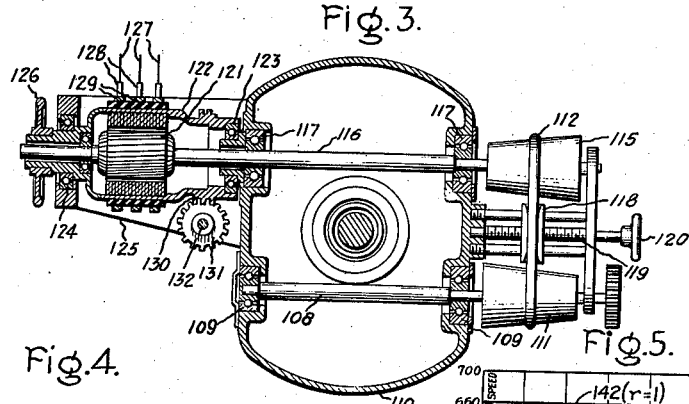
Figure 4:
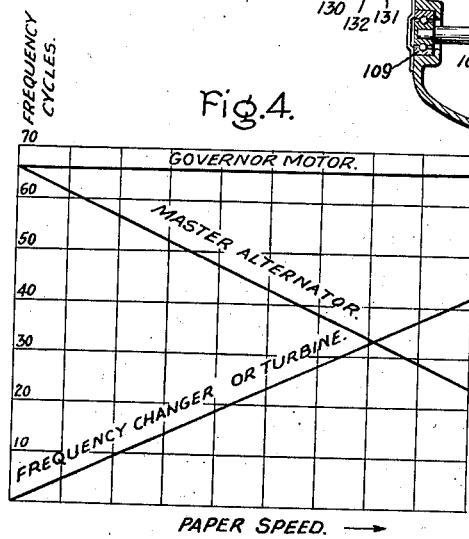
Figure 5:
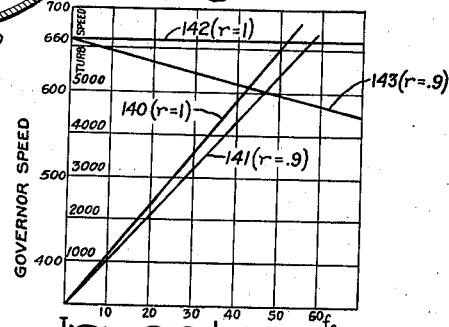

In the drawings, Fig. 1 represents a somewhat diagrammatic view of a prime mover control arrangement in accordance with my invention; Fig. 2 is an enlarged detailed view of a part of Fig. 1; Fig. 3 is a sectional view along line 3—3 of Fig. 2; and Figs. 4 and 5 are explanatory diagrams of the operation of the arrangement shown in Figs. 1 to 3.

The arrangement as best shown in Fig. 1 includes a first section, a second section and a third section. The different sections may form sections of a paper mill to be operated at different speeds with fixed speed ratios between the different sections, more specifically between the first or master section and the other sections. The first section is operated by means including an elastic fluid turbine 10 provided with a reducing gearing 11, and the second section is operated by an elastic fluid turbine 12 provided with a reducing gearing 13. The third section includes a reducing gearing 13a. The first turbine 10 has an inlet conduit 14 with a valve 15 for controlling the flow of elastic fluid to the turbine. The mechanism for positioning or regulating the control valve 15 comprises an elastic fluid motor having a cylinder 16 with a piston 17 movably disposed therein and connected to the stem of the valve 15. The piston is biased downward, that is, towards closing position of the valve 15 by a compression spring 18. The space below the piston communicates with a source of fluid under pressure through conduits 19 and 20. The conduit 19 has a restriction 21 causing fluid under pressure to be normally supplied at constant pressure to the cylinder 16. The pressure within the cylinder is controlled in known manner by a pilot valve which has a fixed casing 22, a bushing 23 slidably disposed within the casing and a valve member in the form of cylindrical sleeve 24 slidably disposed within an axial bore in the bushing 23. The conduit 19 communicates with the bore of the sleeve 24 through a port 25 in the bushing 23. Normally the bushing 23 and the sleeve 24 are at rest and positioned so that the port 25 is partly covered by the upper portion of the sleeve 24. Under such condition a definite pressure is established in the cylinder 16, maintaining the valve 15 in a fixed opening position and a definite flow of fluid takes place from the conduit through the port 25 and the bore of the sleeve 24. The fluid is discharged from the sleeve 24 through openings 26 at the lower end of the sleeve, whence the fluid may be conducted to a tank or other suitable point, not shown. The bushing 23 is connected to the piston 17 of the hydraulic motor by means of a follow-up mechanism which in the present instance includes a fluid-restoring device. More specifically, the mechanism comprises a dashpot having a cylinder 27 connected to a stem 28 of the piston 17. The stem 28 forms in substance an extension of the valve stem 15. A piston 29 is movably disposed within the cylinder 27 and fastened to a stem 30, which latter is pivotally connected to the left-hand end of a lever 31 supported on its right-hand end by a fulcrum 32 and pivotally secured at an intermediate point to the bushing 23. The lever is normally held in a fixed position by means of springs 33 and 34. The dashpot cylinder 27 in known manner is filled with liquid and provided with a by-pass 35. The sleeve 24 is connected to an element responsive to the operating condition, for instance the speed of the turbine. In the present instance this element is shown in the form of a flyball type speed governor 36.

The operation of the mechanism so far described is as follows: An increase in speed of the speed governor 36 causes outward movement of the flyweights or balls whereby the sleeve 24 of the pilot valve is lowered, effecting an increased flow of pressure fluid from the line 19 to the pilot valve because lowering of the sleeve 24 increases the port opening 25 and consequently reducing the restriction or resistance to flow of fluid. This increased flow of fluid causes a drop in pressure within the cylinder 16 of the hydraulic motor whereby the piston 17 is forced downward by the action of the compression spring 18 to effect closing movement of the valve 15. Thus, as in the usual turbine control arrangement, an increase in speed of the speed governor effects closing movement of the turbine valve to reduce the flow of elastic fluid to the turbine and effect a reduction in turbine speed. The follow-up mechanism effects restoring of the original pilot valve position, that is, downward movement of the piston 29 causes downward movement of the left-hand end of the lever 31 through the intermediary of the damping and dashpot cylinder 27. Downward movement of the lever 31 causes downward movement of the bushing 23 into the original relative position with the pilot valve sleeve 24. The purpose of the fluid-restoring mechanism is to render operation of the control mechanism independent of gradual changes in elastic fluid conditions and load. Assuming in the aforementioned example that the increase in governor speed was due to an increase in turbine speed and that the increase in speed took place slowly, then restoring of the pilot valve position is effected by the turbine itself without the aid of the follow-up mechanism. The decrease in turbine speed due to closing of the turbine valve causes a corresponding decrease in governor speed until the governor 36 and consequently the pilot valve sleeve 24 assume their original position. Under such condition the downward movement of the piston 17 of the hydraulic motor takes place slowly. The liquid contained in the dashpot cylinder 27 has sufficient time to be replaced between the upper space and the lower space of the dashpot through the by-pass 35, the dashpot piston 29 under such condition remaining at rest. The dashpot 27, 29 from this viewpoint may be considered as a link of variable length between the hydraulic motor piston 17 and the follow-up lever 31. If, however, the change in turbine condition takes place suddenly and causes a rapid change in governor speed and consequently rapid movement of the hydraulic motor piston 17, the dashpot cylinder 27 will be moved rapidly downward so that the liquid contained therein has no time or at least not sufficient time to be displaced through the by-pass 35 and consequently effects downward movement of the dashpot piston 29 and the left-hand end of the lever 31. During rapid changes the dashpot 27 and the piston 29 act somewhat like a rigid link between the hydraulic motor piston 17 and the lever 31. The downward movement of the lever 31 causes unbalance of the springs 33 and 34. If the two springs are under tension, the tension of spring 34 is reduced and the tension of spring 33 is increased. As the two springs tend to maintain the lever 31 in a position in which they are in equilibrium they will after a downward movement effect gradual upward or return movement, restoring the pilot valve bushing 23 and the lever 31 to their original positions.

The speed governor 36 is driven by an alternating current motor such as a synchronous machine 40, preferably an alternator in the form of a salient pole machine receiving electric energy through conductors 41, 42 from the slip rings 43 of an electrical machine 44. The machine 44 has a rotor driven through a reducing gearing 45 from the shaft 46 of the turbine 10.

Assuming for a moment that the electrical machine 44 is an alternating current generator having a direct current excited stator, then it will be readily understood that the frequency of the current produced in the rotor will be proportional to the speed of rotation of the turbine 10. Assuming further that the turbine 10 is driven at 7200 R. P. M., that the ratio of the reducing gearing 45 is 1:4 and that the electrical machine 44 has 4 poles, then the frequency at the slip rings will be 60 cycles and the speed governor will be driven at 600 R. P. M. if the synchronous motor 40 is of the 12-pole type.

With such an arrangement an increase in speed of the turbine 10 causes an increase in rotor frequency of the alternator 44 and consequently an increased speed of the motor 40 and the governor 36. Vice versa, a drop in speed of the turbine 10 causes a drop in governor speed. The arrangement as just explained would function in substantially the same manner as a speed governor directly and mechanically driven from the turbine shaft. An arrangement of this type with a standard flyball type speed governor permits a speed ratio of the turbine of the order of 1 to 3. A greater speed ratio may be attained by providing the machine 44 or the motor 40 with variable pole numbers. An arrangement of this kind is more fully disclosed in the application of Sverker N. Hedman on Speed governing mechanism, Serial No. 55,263, filed Dec. 19, 1935, and assigned to the same assignee as the present application.

To permit operation of the turbine 10, which is the master turbine, within a wide range of speed at constant speed of the speed governor 36 or within a comparatively small range of speed of the latter, I provide in accordance with my invention an electrical machine 44 in the form of a frequency changer, preferably of the induction type, having a three-phase wound rotor driven by the turbine 10 and provided with the slip rings 43, and a three-phase wound stator connected by conductors 50 to a three-phase line 51 of variable frequency. With such an arrangement the output frequency of the frequency changer 44 at the slip rings 43 is equal to the input frequency supplied through the conductors 50 to the rotor plus or minus the fictitious frequency of rotor rotation, that is, the output frequency is equal to the sum of the input frequency and the fictitious frequency of rotor rotation if the rotor is turned in a direction opposite to the direction of the stator field, and the output frequency is equal to the difference between the input frequency and the fictitious fretions at substantially the same speed. This, however, is not sufficient. It must be possible to operate different sections of a paper mill or like arrangement under certain conditions at exactly the same speed and under other conditions at different speeds having definite ratios with regard to the speed of the master section. For instance, considering the speed of the master section as 100%, it may be desirable to operate the second section at 96%, the third section at 104% and so on, and these speed relations must be maintained fixed within a speed ratio of 1:10 of the master section.

The mechanism for adjusting and maintaining constant the speed relation between the section 2 and the section 1, the master section, is shown on a large scale in Figs. 2 and 3. The arrangement includes a bevel gearing 105 having one gear secured to the shaft of the turbine 12 and another gear secured to a drive shaft 106 which is connected through a gearing 107 to a shaft 108. The latter is supported by ball bearings 109 on a casing or dome 110 for the speed governor 88. A cone pulley 111 is secured to the shaft 108 and connected by an adjustable belt mechanism comprising a belt 112 to another pulley 115 secured to a shaft 116, which latter is also supported by ball-bearings 117 on the governor dome 110. The belt mechanism in addition to the belt includes a fork 118 engaging the belt and a screw-threaded rod 119 with a handwheel 120 and screwed through the fork 118. In the present instance the belt 112 is shown in a neutral position in which it engages portions of equal diameter on the two cone pulleys, thus maintaining a speed ratio between the pulleys of 1:1. Rotation of the handwheel 120 causes shifting of the belt to different portions of the pulleys, thus changing the speed ratio between the pulleys.

The left-hand end of the shaft 116 carries a rotor 121 of a synchronous speed adjusting motor, preferably of the salient pole type, and including a stator having a casing 122 rotatably supported on the right-hand end by a bearing 123 held on the dome 110 and on the left-hand end by a bearing 124 held on a bracket 125 secured to the dome 110. The rotatable stator casing 122 has an extension on its left-hand end to which a handwheel 126 is secured for manual adjustment of the casing 122. The stator which includes the stator casing is three-phase wound and supplied with alternating current through conductors 127 and brushes 128 contacting three slip rings 129 secured to and electrically insulated from the casing 122. A worm gear 130 is integrally formed with the right-hand portion of the stator casing 122 and meshes with a worm gear 131 mounted on a vertical shaft 132. The lower portion of the shaft 132 is rotatably supported by the bracket 125 and the upper portion of the shaft is rotatably supported on a bracket 133. The upper shaft portion has a screw-threaded extension 134 engaging a nut 135, which latter is connected to the left-hand end of the lever 94 by the link 104 which forms the aforementioned fulcrum for the lever 94. The conductors 127 are connected by conductors 136 (Fig. 1) to slip rings 137 of an alternator 138 mechanically driven from the master or first section turbine 10. The alternator 138 is driven from the master turbine 10 through the gearing 45 which, as stated above, in the present example has a ratio of 1:4. The rotor 121 of the speed-adjusting motor, as just explained, is driven from the turbine 12 of the second sections through the intermediary of the bevel gears 105, the gearing 107 and the adjustable cone belt drive 111 to 115. In the present example the bevel gears 105 have a speed ratio of 1:1 and the gearing 107 has a speed ratio of 1:4 so that the rotor 121 of the adjusting motor is driven from the turbine 12 at a speed reduction of 1:4 when the belt 112 of the cone pulley drive is in neutral position.

The operation of the speed control and speed-adjusting mechanism of the second section in cooperation with the first section is as follows: Let us consider first the case where the second section is to be operated at the same speed with the same number of revolutions in a given time as the first section. Let us further assume that the first section or master turbine 10 is operating at a speed of 5040 R. P. M. Under this condition the frequency in the line 51 is 24 cycles and the frequency at the slip rings 43 of the frequency changer is 42+24=66 cycles. The stator of the frequency changer 81 of the second section then is supplied with current of 24 cycles and if the turbine 12 is rotated at the same speed as the turbine 10, that is at 5040 R. P. M., the frequency at the slip rings 34 of the frequency changer 81 will be 66 cycles, that is, the same as the frequency at the slip rings 43 of the frequency changer of the first section. The governor motor 87 being a 12-pole motor, the same as the governor motor 40 of the first section, then is operated at its normal speed of 660 R. P. M. As pointed out before, the belt on the cone pulleys is maintained in its neutral position to give a speed ratio of 1:1 when it is desired to run the second section at the same speed as the first section. As under such condition the speed ratio between the turbine 12 and the rotor 121 of the adjusting motor is 1:4, the rotor 121 is driven at a speed of $$\frac{5040}{4}$$

that is, at 1260 R. P. M. Assuming that the adjusting motor is of the 4-pole type, the aforementioned rotor speed of 1260 R. P. M. constitute a fictitious frequency of rotor rotation of $$\frac{2 \times 1260}{60} = 42$$

cycles. In the present arrangement the alternator 138 driven from the first section at 1260 R. P. M. is also of the 4-pole type and thus in the present instance generates a current of 42 cycles. This current is supplied from the slip rings 137 through the conductors 136 and 127, the brushes 128 and the slip rings 129 to the stator 122 of the speed-adjusting motor. The arrangement is such that the rotor 121 is turned in the direction of the stator field, that is, of the field produced by the current supplied to the stator. This, however, means that the stator field is at rest relative to the rotor, hence the field will not cut the conductors of the rotor. No torque will be produced and the stator 122 will remain at rest as long as the fictitious frequency of rotor rotation equals the frequency of the current supplied to the stator. If any discrepancy should arise under which the turbine 12 of the section 2 would make a new revolutions more or less within a given time than the turbine 10 of the first section, the stator 122 of the speed-adjusting motor will immediately rotate and in so doing will raise or lower the fulcrum link 104 for the restoring lever 94 and continue to do so until the speed or number of revolutions within a given time of the second section equals that of the first section. Thus, the arrangement as a whole is self-corrective. What applies to the relation between the first and the second section applies also to the relation between the first and the third and other sections. The third and other sections (not shown) may be exactly like the second section. As it is possible with the arrangement so far described to operate two or more turbines or other prime-mover driven sections at exactly the same speed, it obviously follows that the different sections may be operated at different speeds but under constant speed relations. This is accomplished by setting or adjusting the belt 112 of the cone pulleys to change the speed ratio between the pulleys. A temporary speed change of the turbine 12 may be effected by turning of the handwheel 126.

Let us now assume that the belt 112 is set for a ratio at which the cone pulley 115 and consequently the rotor 121 of the speed-adjusting motor are rotated at a speed of 10% above that of the cone pulley 111. With a turbine speed of 5040 R. P. M. of the master section this will produce a torque in the stator of the speed-adjusting motor due to the difference of 4.2 cycles between the fictitious frequency of rotor rotation which is 42+4.2 and the frequency supplied to the stator which is 42 cycles. Rotation of the stator under the present condition causes upward movement of the fulcrum link 104, thus raising the bushing 92 of the pilot valve 90 and reducing the fluid pressure below the piston 97 of the hydraulic motor 91, resulting in closing movement of the valve 80 and consequently reduced speed of the turbine 12. The speed reduction of the turbine 12 will continue until rotor 121 of the speed-adjusting motor has come to rest which in the present instance is possible only when the speed of the cone pulley 115 has resumed its original value, namely, 1260 R. P. M. This means that the cone pulley 111 must rotate at a speed 10% below that of the cone pulley 115, that is, at a speed of 1260−126=1134 R. P. M. Hence the speed of the turbine 12 must be 1134×4=4536 R. P. M. which is 10% below the original speed of 5040 R. P. M. At this speed of 4536 R. P. M. the rotor of the frequency changer 81 is rotated at a speed of $$\frac{4536}{4}=1134 \text{ R. P. M.},$$

constituting a fictitious frequency of rotor rotation of $$\frac{2\times 1134}{60}=37.8$$

cycles which is 10% below the original fictitious frequency of rotor rotation of 42 cycles. Hence the frequency at the slip rings 84 now is 24+37.8=61.8 cycles. A current of this frequency being supplied to the governor motor 87 causes rotation of the latter at a speed of $$\frac{60\times 61.8}{6}=618 \text{ R. P. M.}$$

Thus a change in turbine speed of 10% causes in the present instance a change in governor speed of about 6.4%.

Let us now assume that the master frequency in line 51 is raised from 24 cycles to 61.8 cycles. This, as pointed out heretofore, will reduce the speed of the master turbine 10 from 5040 to 504 R. P. M., constituting a fictitious frequency of rotor rotation of 4.2 cycles and producing an actual frequency of 4.2 cycles at the slip rings 137 of the alternator 138. Under this condition a current of 4.2 cycles is supplied through the conductors 136 and 127 to the stator 122 of the speed-adjusting motor of the second section, and a current of 61.8 cycles is supplied through the line 51 and the conductors 83 to the stator 81 of the second section. The following conditions must prevail to establish equilibrium of the governing mechanism of the second section. The rotor 121 of the speed-adjusting motor must be rotated at a speed of $$\frac{60\times 4.2}{2}=126 \text{ R. P. M.}$$

to assure that the stator will remain at rest. At a rotor speed of 126 R. P. M. of the speed-adjusting motor and a cone pulley speed ratio of 0.9:1, the cone pulley 111 is rotated at a speed of 126×.9=113.4 R. P. M. and the speed of the turbine then is 113.4×4=453.6. This speed, however, is 10% below 504, that is, the speed of the master turbine 10. At a speed of 453.6 of the turbine 12 the fictitious frequency of rotor rotation of the frequency changer 81 is $$\frac{453.6}{4}\times\frac{2}{60}=3.78$$

Thus the frequency at the slip rings 84 of the frequency changer 81 will be 61.8+3.78=65.58 cycles. At this frequency the governor motor 87 will rotate at $$\frac{60\times 65.58}{6}=655.8 \text{ R. P. M.}$$

This causes movement of the pilot valve sleeve 89 which is compensated by a corresponding movement of the pilot valve bushing 92 by the action of the adjusting motor. If we designate with $f_f$ the fictitious frequency of rotor rotation of the master section and with $r$ the speed ratio of the cone pulley drive, then the following formula representing the frequency $f$ at the slip rings 84 of the frequency changer 81 can be easily deducted from the above consideration:

$$f=(f_f\times r)+(66-f_f)$$

the expression $66-f_f$ representing the frequency in line 51. From this formula it follows that for $r=0.9$ and $f_f=4.2$, $f=65.58$, and for the same ratio and $f_f=42$, $f=61.8$ cycles. The formula also shows that for a ratio of 1:1 the frequency of the frequency charger is, as is expected, 66, that is, the same as that of the frequency charger of the master section.

The diagram of Fig. 5 shows a curve 140 which represents the turbine speed in revolutions per minute plotted against the fictitious frequency $f_f$ for a ratio $r=1$. The curve 141 represents the turbine speed of any but the master section for $r=.9$. The curve 142 illustrates the governor speed, that is, the speed of the motor 87 plotted over the same fictitious frequency of rotor rotation (which, as stated heretofore, is proportional to the turbine speed) for a ratio $r=1$, and curve 143 represents the governor speed of any but the master section for $r=.9$. The diagram shows that for a ratio $r=1$, the speed of the turbine 12 is the same as that of the master turbine 10 and the speed of the governor motor 87 is constant and the same as that of the governor motor 40. For a ratio $r=.9$, the speed of the turbine 12 is 10% below the speed of the master turbine 10 throughout the entire speed range and the speed of the governor motor 87 is no longer constant. Thus, with the speed-setting and adjusting mechanism of the second section, it is possible to maintain fixed speed relation between the first and the second section at varying speed of the first or master section. What has been said about the second section applies to the third and any other number of sections which may be provided.

Summarizing, with my invention I have accomplished an improved construction and arrangement of speed-governing mechanisms including a speed governor, preferably of the flyball type, for positioning a valve controlling the flow of operating fluid to an elastic fluid engine in response to speed changes of the engine. The speed-governing mechanism includes means for effecting a wide variation of engine speed at constant governor speed. The governor speed during any speed variation of the engine changes temporarily only but ultimately resumes a constant value. The speed-governing mechanism broadly includes a speed governor for positioning the engine valve through the intermediary of a hydraulic motor and a pilot valve. The pilot valve has a control sleeve mechanically connected to the speed governor and a bushing connected through the intermediary of a follow-up mechanism including a dashpot to the hydraulic motor. The governor is driven by a synchronous motor, preferably of the salient pole type, to which current is supplied by a frequency changer. The latter has a rotor element mechanically driven from the turbine element and a stator element. One of said elements in the specific example shown in the drawings, the stator element, is connected to a source of alternating current of variable frequency, and the other element in the aforementioned example, the rotor element, has slip rings electrically connected to the governor motor. In an arrangement such as a paper mill drive including a plurality of elastic fluid engines for driving separate sections of the paper mill at definite speed relations, each such engine includes a speed-governing mechanism of the kind just briefly described. The speed-governing mechanism of each elastic fluid engine except that of the first or master engine in addition includes auxiliary means or a draw in mechanism for fixing and varying the speed relation between the first or master engine and each of the other engines. The speed-setting or draw mechanism comprises an electric motor which has a rotatably supported stator and a rotor driven through the intermediary of a variable ratio gearing such as a cone pulley drive from the turbine of the corresponding section. The rotatable stator is electrically connected to an alternator driven from the first engine, that is, to a source of alternating current of a frequency proportional to the speed of the master engine. The stator is mechanically connected to the restoring lever and the pilot valve of the corresponding speed-governing mechanism.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. The combination of an elastic fluid engine and a speed-governing mechanism for controlling the engine, said mechanism including a speed governor, an electric motor for operating the speed governor, and a source of electric energy for the motor, said source including a frequency changer electrically connected to the motor and driven from the engine.

2. The combination of an elastic fluid engine having an inlet valve for controlling the flow of elastic fluid thereto and a speed-governing mechanism including a speed governor and means for gradually varying the turbine speed at constant speed of the speed governor, said means comprising a synchronous motor for driving the speed governor and a frequency changer having a stator for receiving alternating current at variable frequency and a rotor mechanically driven from the engine and provided with slip rings electrically connected to the motor.

3. The combination of an engine having a valve for controlling the flow of operating fluid thereto and a speed-governing mechanism for positioning the valve, said mechanism comprising an electric alternating current source of variable frequency, a frequency changer having a stator element and a rotor element, a speed governor, a motor for driving the speed governor, one of said elements being electrically connected to the motor and the other element being electrically connected to the alternating current source, and means for positioning the valve in response to speed changes of the speed governor whereby the turbine speed may be gradually varied within a wide speed range at constant governor speed.

4. The combination of an engine having a valve for controlling the flow of operating fluid thereto and a speed-governing mechanism for positioning the valve, said mechanism comprising an electric alternating current source of variable frequency, a frequency changer having a stator element and a rotor element, a speed governor, a motor for driving the speed governor, one of said elements being electrically connected to the motor and the other element being electrically connected to the alternating current source, a hydraulic motor having a piston connected to the valve, means including a pilot valve having a control sleeve mechanically connected to the speed governor for controlling the flow of actuating fluid to the hydraulic motor and a follow-up mechanism between the motor and the pilot valve including a fulcrumed lever, a dashpot connecting the lever to the hydraulic motor piston, a bushing forming part of the pilot valve connected to the lever, and spring means normally retaining the lever in a neutral position.

5. The combination of a plurality of engines, each engine including a valve for controlling the flow of operating fluid thereto and a speed-governing mechanism for controlling the valve, and electrical means for maintaining fixed speed relation between all of the elastic fluid engines during varying speed of one of the engines.

6. The combination of a first and a second elastic fluid engine, each engine including valve means for controlling the flow of operating fluid thereto, and speed-responsive means for controlling the valve means in response to speed changes, the second engine including auxiliary means electrically interconnected with the first engine to maintain fixed speed relation between the engines at varying speed of the first engine.

7. The combination of a first engine having a valve for controlling the flow of operating fluid thereto, a first speed-governing mechanism for controlling the valve comprising a speed governor, an electric motor for driving the speed governor, a source of alternating current of variable frequency and a frequency changer having a stator element and a rotor element with one element electrically connected to the source and the other element electrically connected to the motor, a second engine having a valve member for controlling the flow of operating fluid thereto, and a second speed-governing mechanism for controlling the valve member, the speed-governing mechanism including all of the elements of the mechanism of the first engine and in addition auxiliary means to maintain fixed speed relation between the two engines at varying speed of the first engine and to vary the speed relation between the engines.

8. The combination of a first engine having a valve for controlling the flow of operating fluid thereto, a first speed-governing mechanism for controlling the valve comprising a speed governor, an electric motor for driving the speed governor, a source of alternating current of variable frequency and a frequency changer having a stator element and a rotor element with one element electrically connected to the source and the other element electrically connected to the motor, a second engine having a valve member for controlling the flow of operating fluid thereto and a second speed-governing mechanism for controlling the valve member, the second speed-governing mechanism including elements similar to those of the first speed governing mechanism and in addition auxiliary means to maintain fixed speed relation between the two engines at varying speed of the first engine and to vary the speed relation between the engines, said auxiliary means including a synchronous electric motor having a rotor and a rotatable stator, a variable speed drive for driving the rotor in response to rotation of the second engine, an alternator driven from the first engine and electrically connected to the rotatable stator, and adjustable fulcrum means movable in response to rotary movement of the stator to adjust the second speed governing mechanism.

9. The combination of a first and a plurality of other elastic fluid engines having valves for controlling the flow of operating fluid thereto, and a speed-governing mechanism for each elastic fluid engine for controlling the valves, each speed-governing mechanism comprising a flyball type speed governor, means including a pilot valve and a hydraulic motor for moving the valve in response to movement of the governor, an adjustable follow-up mechanism between the pilot valve and the motor, a governor motor for driving the governor, a frequency changer having a rotor mechanically driven from the engine and electrically connected to the governor motor, and a common source of alternating current of variable frequency electrically connected to the stators of all frequency changers, the governing mechanism of each of the other elastic fluid engines including auxiliary means for maintaining fixed speed relation between each of the other elastic fluid engines and the first elastic fluid engine at varying speed of the latter, each auxiliary means including a synchronous motor having a rotor and a rotatable stator, an adjustable drive for driving the rotor in response to the rotation of the corresponding engine, means for supplying alternating current to the stator and varying the frequency of said current in proportion to speed variations of the first engine, and means mechanically connected between the stator and the follow-up mechanism for adjusting the governing mechanism is response to rotary movement of said stator.

10. An arrangement for setting and controlling the speed relation between two independent engines comprising a speed-setting alternating current motor having a rotor and a rotatable stator, an alternator to be driven in proportion to the speed of one engine and electrically connected to said stator, means for driving the rotor in proportion to the speed of the other engine, and means moved in response to rotation of the rotor to adjust the speed of the other engine.

11. An arrangement for setting and controlling the speed relation between two independent engines having speed control mechanisms comprising a speed-adjusting alternating current motor having a rotor and rotatable stator, an alternator to be driven by one engine and electrically connected to the stator, means including a variable speed drive for driving the rotor in proportion to the speed of the other engine, and means moved in response to rotation of the rotor for adjusting the governing mechanism of the other engine.

12. A speed-governing mechanism comprising means including a speed governor for regulating an element of a machine to be controlled, synchronous motor means for driving the governor, and electrical means including a source of alternating current for energizing the synchronous motor means with current of a frequency equal to the sum of the frequency of the source and a frequency proportional to the speed of the machine to be controlled.

13. A speed-governing mechanism comprising means including a speed governor for regulating an element of a machine to be controlled, synchronous motor means for driving the governor, electrical means including a source of alternating current for energizing the synchronous motor means with current of a frequency equal to the sum of the frequency of the source and a frequency proportional to the speed of the machine to be controlled, and means for varying the frequency of the source.

14. The combination of a machine having an element to be controlled and a speed-governing mechanism comprising means including a speed governor for positioning the element, and synchronous electrical means including a source of electric energy of variable frequency for driving the speed governor at a speed proportional to the sum of the frequency of the source and a frequency proportional to the speed of the machine.

15. A speed-governing mechanism for controlling a machine comprising a speed governor, an alternating current motor for driving the speed governor, and a frequency changer electrically connected to the motor and driven at a speed responsive to speed changes of the machine to be controlled.

16. A speed-governing mechanism comprising a speed governor, alternating current motor means for driving the governor, and electrical means for energizing the motor including a frequency changer electrically connected to the motor.

17. A speed-governing mechanism comprising a speed governor, a source of alternating current of variable frequency, and electrical means for driving the speed governor in response to the sum of the frequency of the alternating current source and a frequency proportional to the speed of a machine to be controlled.

REGINALD G. STANDERWICK.